June 2, 1959  O. STEINER ET AL  2,888,868
PARALLAX COMPENSATING MECHANISM FOR PHOTOGRAPHIC CAMERAS
Filed Sept. 29, 1954  2 Sheets-Sheet 1

INVENTOR.
OSCAR STEINER
AND ROBERT L. DALTON
BY
ATTORNEY

June 2, 1959  O. STEINER ET AL  2,888,868
PARALLAX COMPENSATING MECHANISM FOR PHOTOGRAPHIC CAMERAS
Filed Sept. 29, 1954  2 Sheets-Sheet 2

INVENTOR.
OSCAR STEINER
AND ROBERT L. DALTON
BY
ATTORNEY

United States Patent Office 2,888,868
Patented June 2, 1959

2,888,868

PARALLAX COMPENSATING MECHANISM FOR PHOTOGRAPHIC CAMERAS

Oscar Steiner and Robert L. Dalton, Irondequoit, N.Y., assignors to Graflex, Inc., Rochester, N.Y., a corporation of Delaware Application September 29, 1954, Serial No. 459,023

3 Claims. (Cl. 95—44)

The present invention relates to photographic cameras and more particularly to parallax correcting mechanisms for the viewfinders of photographic cameras of the type in which the objective lens is adjustable for focusing.

In previous conventional designs of parallax correcting mechanisms the correction has had to be effected manually. Such parallax correcting mechanisms as have heretofore been proposed that are automatic in operation, have been relatively complicated in construction and relatively expensive to make.

One object of the present invention is to provide a parallax correcting mechanism which is automatic in operation and which will correct simultaneously for both vertical and horizontal parallax.

Another object of the invention is to provide a parallax correcting mechanism of the character described which will be simple in construction and relatively inexpensive.

A further object of the invention is to provide a parallax correcting mechanism of the character described which is usable with the rangefinder of a camera in which the parallax correcting device is actuated from the same means and simultaneously with the adjustment of the deflection member of the rangefinder.

Other objects of the invention will be apparent hereinafter from the specification and from the recital of the appended claims.

Figure 1:
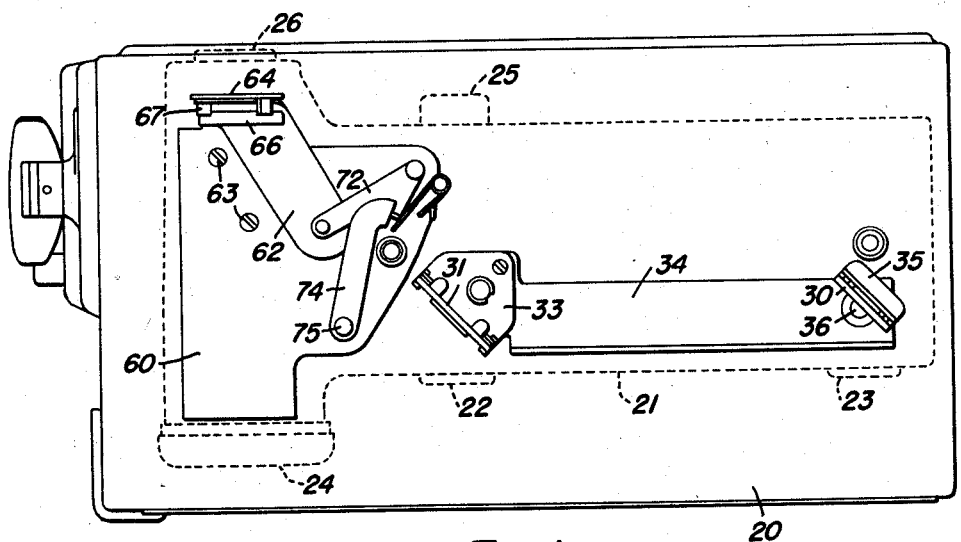
Fig. 1 is a plan view of a camera casing having mounted on the top thereof a combination rangefinder and viewfinder, the casing for the combination rangefinder-viewfinder being broken away to show the parallax correcting mechanism of the present invention and the two mirrors of the rangefinder and the casing itself being shown only in outline.
Figure 2:
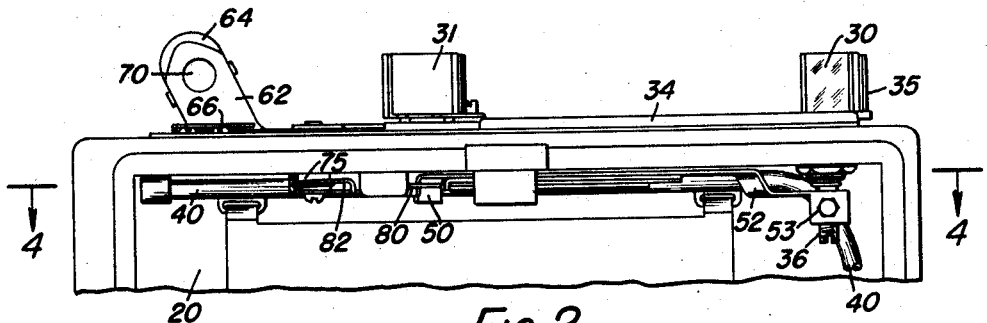
Fig. 2 is a fragmentary vertical section through the camera and rangefinder, with the rangefinder casing removed, showing the parallax correcting device and the means for actuating this device and the two mirrors of the rangefinder.
Figure 3:
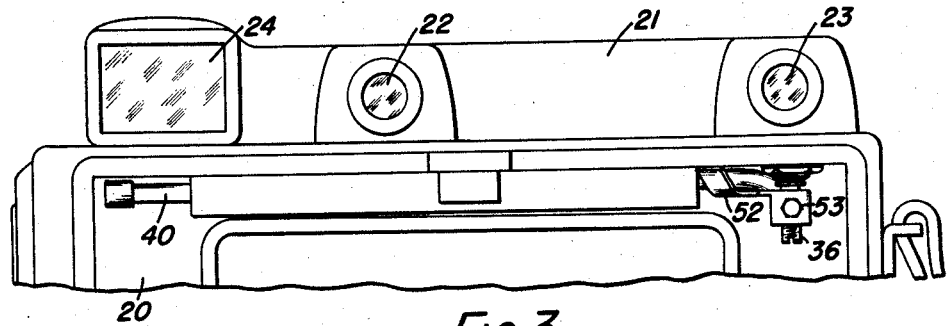
Fig. 3 is a fragmentary front elevation of the camera showing the combined viewfinder-rangefinder mounted on top thereof.

Referring now to the drawings by numerals of reference, 20 denotes the camera casing; and 21 designates a housing for a viewfinder and a rangefinder mounted on top of the camera casing 20. The housing 21 has mounted in the front thereof the windows 22 and 23 for the rangefinder, and the lens 24 for the viewfinder. Mounted in the rear of this housing to register with the window 22 is the eyepiece 25 of the rangefinder system; and mounted in the rear of the housing 21 to register with the lens 24 is the eyepiece 26 of the viewfinder system.

The rangefinder comprises a rotatable mirror or reflector 30 and a fixed semi-transparent mirror 31. The mirror 30 is mounted to register with the window 23. The mirror 31 is mounted to register with windows 22 and 25. Mirror 31 may be fastened on a bracket 33 which is secured to a supporting beam 34. Mirror 30 may be mounted upon a support 35 that is secured on a shaft 36. The construction of the rangefinder forms no part of the present invention. It may be similar to that disclosed in our U.S. patent application Serial No. 309,432, filed September 13, 1952, now Patent No. 2,713,815, granted July 26, 1955.

The rangefinder may be coupled to the focusing mechanism of the camera in any suitable way so that the reflector 30 will pivot upon focusing adjustment of the objective lens of the camera. This coupling mechanism may be for instance similar to that described in our patent above mentioned. A pin or follower carried by a bracket, that is mounted to move with the objective lens of the camera in focusing, may, for instance, as in the mechanism described in the above mentioned application, actuate through a plunger, a column of balls 41 which are enclosed in a tube 40 and which abut against one another and transmit the focusing motion to a plunger 42 which is enclosed in and slides in the tube 40. The plunger 42 engages one end of a cam 43 which projects outwardly at both sides of the tube 40 through aligned diametral slots in the tube. The cam is held resiliently in engagement with the plunger 42 by a spring-pressed plunger 44 which engages the other end surface of the cam. The plunger 44 is held in engagement with the cam 43 by a coil spring 45 which is housed in the tube 40. The tube 40 is mounted in the camera case; and in the present instance extends upwardly along one side of the case and across the top of the case. The supporting bracket for the tube has a lateral wing 47 against which the back side 48 of the cam seats. The active surface 49 of the cam engages one end 50 of an arm 52 which is secured to shaft 36 by a set screw 53. Hence, as the objective lens is focused, motion is transmitted through the balls 41 and plunger 42 to the cam 43, to rock the arm 52, and shaft 36, and pivot the reflector 30 of the rangefinder.

The arm 52 also actuates the parallax correcting device 62.

This device is slidable on a base 60 which is secured to the camera case by screws 63. Base 60 has an upstanding portion 64 which is provided with an elongate oblong slot 65 (Fig. 6) that is inclined both to the vertical and to the horizontal. Base 60 has also struck up from it a guide or deflecting bar 66 (Figs. 1, 5 and 6) which overlies the main portion of the base 60 and is parallel thereto and spaced therefrom. The upright portion 64 of the base is formed with parallel guide lugs 67 and 68 at opposite sides which project forwardly.

Figures 5, 7:
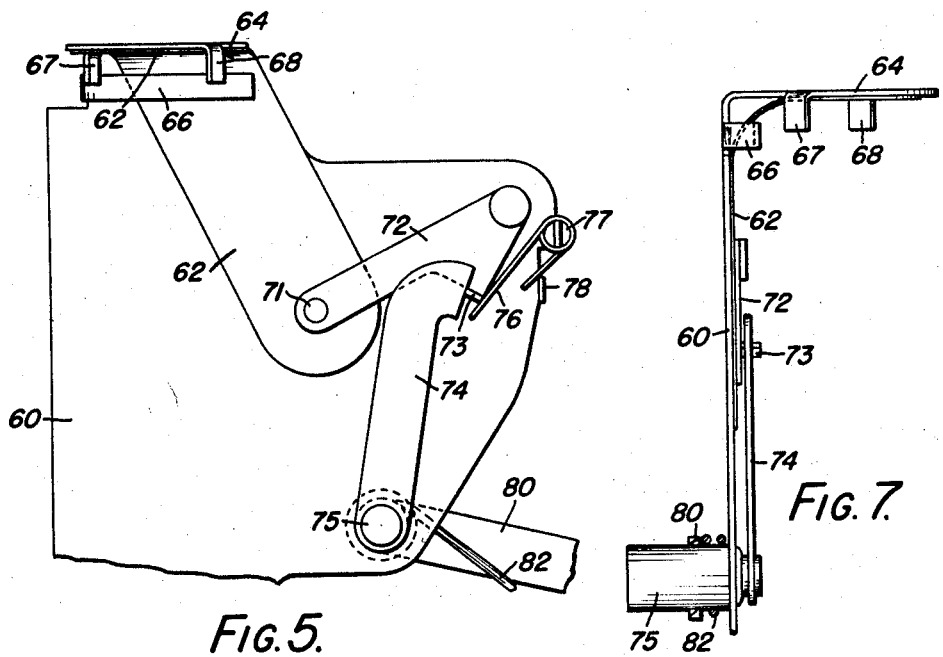
Fig. 5 is a fragmentary plan view on an enlarged scale showing details of the parallax correcting device and means for actuating the same.
Fig. 7 is a side elevation thereof.
Figures 6, 8:
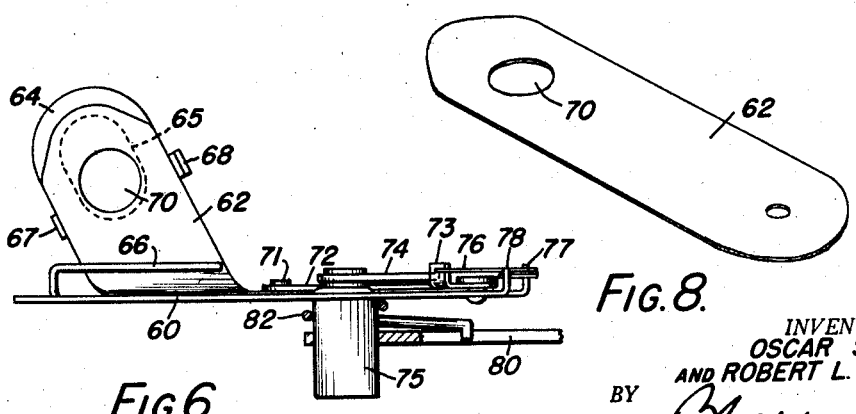
Fig. 6 is a front elevation of the parts shown in Fig. 5.
Fig. 8 is a perspective view of the parallax slide.

The parallax slide 62 is made of thin, steel feeler-gauge stock so that it is quite flexible. In use it is adapted to be bent, intermediate its ends by bar 66, at substantially right angles to itself, as shown in Figs. 6 and 7 and to slide under the guide bar 66 and between the guide lugs 67 and 68. It has a hole 70 adjacent one end which is adapted to register with the slot 65 in the upright portion 64 of the base. It is pivotally connected adjacent its other end by means of a rivet 71 with an arm 72. This arm has a lug 73 struck up from it which engages one end of a lever 74 that is pivotally mounted at its opposite end on a pivot pin 75.

Figure 4:
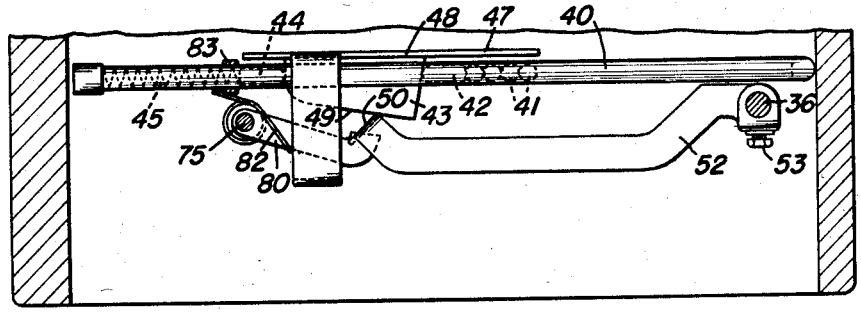
Fig. 4 is a section on the line 4—4 of Fig. 2 looking in the direction of the arrows.

A coil spring 76, that is looped around a pin 77, that is threaded in the base plate 60, and that engages at one end with the lug 73 of the arm 72 and at its opposite end with a lug 78 which is bent up from the base 60, serves to hold the arm 72 in engagement with the lever 74. The lever 74 is secured to the pin 75 which is rotatably mounted in the base 60. Also secured to this pin 75 is a lever arm 80 (Fig. 4) which engages with the downturned portion 50 at the free end of lever 52.

Lever arm 80 is held in engagement with the downturned portion 50 of lever 52 by a coil spring 82 which is wrapped around stud 75 and which engages at one end over the lever arm 80 and at its opposite end against a supporting sleeve 83 (Fig. 4) for the tube 40. This supporting sleeve is struck up from or secured to the camera case. The lever arm 80 is rocked, therefore, simultaneously with the focusing adjustment of the objective lens of the camera; and this lever arm in turn rocks lever arms 74 and 72, imparting sliding movement to the parallax slide 62. Thus, as the objective lens of the camera is adjusted in focusing, the parallax slide 62 will be moved to vary the position of the circular hole 70 in the slide with reference to the oblong hole 65 in the upright portion 64 of the baseplate 60. In this movement of parallax slide 62 the arm 66 will cause the slide to flex and bend so that part of the slide 62 moves in contact with the horizontal portion of the base plate 60 and the other portion of the slide 62 moves in contact with the upright portion 64 of the baseplate. The view which the photographer sees through the eyepiece 26 of the viewfinder is determined by the position of the hole 70 in the parallax slide. The guide lugs 67 and 68 of the upright portion 64 are parallel to one another, but inclined to the vertical. Hence, as the parallax slide moves, the hole 70 is displaced not only vertically but laterally, that is, horizontally with reference to the hole 65. Therefore, there is automatic correction for parallax both horizontally and vertically with focusing adjustment of the camera. The angular movement of the slide 62 in a vertical plane is provided because the view finder objective or eyepiece is displaced both horizontally and vertically from the camera objective.

Because the parallax slide is made of steel feeler gauge stock the whole device is extremely simple and relatively inexpensive.

While the invention has been described in connection with a specific embodiment thereof, it will be understood that it is capable of further modification; and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described our invention, what we claim is:

1. In a photographic camera having an objective lens mount disposed at its front and that is adjustable for focusing, and a viewfinder positioned at its back and offset with reference to the axis of the lens mount, means for defining the field of view of the viewfinder comprising a flat, flexible strap, a pair of guide surfaces disposed at an angle to each other and on which said strap slides, one of said surfaces being positioned at the end of the other surface so that said strap in its movement flexes intermediate its ends at the juncture of the two surfaces to move from one onto the other, one surface having an aperture therein registering with said viewfinder, one portion of said strap having an aperture to register with the aperture in said one surface, said one portion of said strap sliding on said one surface and a linkage mounted inside said camera for coupling another portion of said strap to said objective lens mount to move said strap automatically on focusing adjustment of said lens mount and in proportion to the adjustment of said lens mount, to correct for parallax, said linkage including a member movable in a plane parallel to the plane of said other surface.

2. A photographic camera as claimed in claim 1, wherein one aperture is elongate in the direction of movement of said one portion of said strap and is longer in said direction than the other aperture.

3. A photographic camera as claimed in claim 2, wherein said viewfinder is offset both vertically and horizontally with reference to the axis of said lens mount, and wherein means is provided for guiding said one portion of said strap in its sliding movement on said one surface so that said one portion of said strap moves in a direction inclined to both the vertical and horizontal.

References Cited in the file of this patent

UNITED STATES PATENTS

| | | |
|---|---|---|
| 1,583,706 | Tessier | May 4, 1926 |
| 1,921,171 | Jonson et al. | Aug. 8, 1933 |
| 2,123,494 | Barnack | July 12, 1938 |
| 2,157,547 | Leitz | May 9, 1939 |
| 2,157,548 | Leitz | May 9, 1939 |
| 2,211,995 | Walker | Aug. 20, 1940 |
| 2,231,734 | Ort | Feb. 11, 1941 |
| 2,342,509 | Gaty et al. | Feb. 22, 1944 |
| 2,481,656 | Gillon et al. | Sept. 13, 1949 |
| 2,717,543 | McCathron | Sept. 13, 1955 |